(12) United States Patent
Claver et al.

(10) Patent No.: US 12,164,163 B2
(45) Date of Patent: *Dec. 10, 2024

(54) OPTICAL FIBER DEVICE HAVING ANNULAR AND AXIAL GROOVES

(71) Applicant: PPC BROADBAND, INC., East Syracuse, NY (US)

(72) Inventors: Nicholas V. Claver, Liverpool, NY (US); Daniel Daoust, Syracuse, NY (US); Steve Stankovski, Clay, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,533

(22) Filed: Mar. 3, 2022

(65) Prior Publication Data

US 2022/0196947 A1 Jun. 23, 2022

Related U.S. Application Data

(63) Continuation of application No. 16/740,090, filed on Jan. 10, 2020, now Pat. No. 11,300,743.

(60) Provisional application No. 62/790,499, filed on Jan. 10, 2019.

(51) Int. Cl.
| G02B 6/44 | (2006.01) |
| F21V 8/00 | (2006.01) |
| G02B 6/36 | (2006.01) |
| G02B 6/38 | (2006.01) |

(52) U.S. Cl.
CPC ......... *G02B 6/4401* (2013.01); *G02B 6/0038* (2013.01); *G02B 6/38875* (2021.05); *G02B 6/4408* (2013.01); *G02B 6/3636* (2013.01)

(58) Field of Classification Search
CPC ............... G02B 6/44; G02B 6/36; G02B 6/00
See application file for complete search history.

(56) References Cited

U.S. PATENT DOCUMENTS

| 4,739,801 A | 4/1988 | Kimura et al. |
| 5,473,723 A | 12/1995 | Stockman et al. |
| 6,639,152 B2 | 10/2003 | Glew et al. |
| 9,419,375 B2 | 8/2016 | Dieduksman et al. |
| 10,575,903 B2 | 3/2020 | Shimizu et al. |
| 11,300,743 B2 * | 4/2022 | Claver ................. G02B 6/4401 |

(Continued)

OTHER PUBLICATIONS

Extended European Search Report dated Aug. 1, 2022 in corresponding European Patent Application No. 20738777.0, 8 pages.

(Continued)

*Primary Examiner* — Tina M Wong
(74) *Attorney, Agent, or Firm* — MH2 TECHNOLOGY LAW GROUP LLP (57) ABSTRACT

A fiber optic cable includes an outer surface, an axial groove and an additional annular groove. The outer surface includes an annular groove. The axial groove that extends in an axial direction of the fiber optic cable. The additional annular groove is configured to separates sections of the outer surface. The axial groove is configured to be gripped by a connector to prevent rotation of the fiber optic cable relative to the connector. The separate sections are configured to hinge against each other such that the fiber optic cable is bendable to a predetermined bend radius.

28 Claims, 12 Drawing Sheets

(56) References Cited

U.S. PATENT DOCUMENTS

| | | |
|---|---|---|
| 2004/0266259 A1 | 12/2004 | Moseley |
| 2005/0098342 A1 | 5/2005 | Sakabe et al. |
| 2005/0199415 A1 | 9/2005 | Glew |
| 2006/0104579 A1 | 5/2006 | Fitz |
| 2007/0047883 A1 | 3/2007 | Watte et al. |
| 2007/0102188 A1 | 5/2007 | Glew |
| 2007/0280611 A1 | 12/2007 | Dyer et al. |
| 2008/0044145 A1 | 2/2008 | Jenkins et al. |
| 2008/0066947 A1 | 3/2008 | Glew |
| 2010/0111480 A1 | 5/2010 | Bohler et al. |
| 2010/0278492 A1 | 11/2010 | Bohler et al. |
| 2012/0063731 A1 | 3/2012 | Fitz et al. |
| 2013/0028568 A1 | 1/2013 | Beamon et al. |
| 2013/0048338 A1 | 2/2013 | Suzuki et al. |
| 2015/0268432 A1 | 9/2015 | Kato |
| 2016/0238813 A1 | 8/2016 | Stockton et al. |
| 2017/0038533 A1 | 2/2017 | Segsworth et al. |
| 2018/0128991 A1 | 5/2018 | Vallance et al. |
| 2018/0329157 A1 | 11/2018 | Crawford et al. |
| 2020/0012063 A1 | 1/2020 | Lambert et al. |
| 2020/0225433 A1 | 7/2020 | Claver et al. |
| 2020/0292772 A1 | 9/2020 | Oka et al. |
| 2021/0026072 A1 | 1/2021 | Kanno |
| 2022/0196947 A1* | 6/2022 | Claver ................. G02B 6/4408 |

OTHER PUBLICATIONS

Search Report and Written Opinion issued in corresponding International Patent Application No. PCT/US2020/013162 dated Apr. 6, 2020 (13 pages).

* cited by examiner

FIG. 12

OPTICAL FIBER DEVICE HAVING ANNULAR AND AXIAL GROOVES

CROSS-REFERENCE TO RELATED APPLICATION

This application is a continuation of U.S. Nonprovisional application Ser. No. 16/740,090 filed Jan. 10, 2020, pending, which claims the benefit of U.S. Provisional Application No. 62/790,499 filed Jan. 10, 2019, the disclosures of which are incorporated by reference herein in their entireties.

BACKGROUND

The present disclosure relates to the processing of linear members, such as cables, ducts, and tubes, having annular and axial grooves. More particularly, the disclosure relates to a fiber optic cable having annular and axial grooves, and a fiber optic cable assembly that includes such a fiber optic cable.

Some conventional cables and ducts, for example, cables and ducts used in the fiber optic cabling industry, include a series of parallel annular (or circumferential) grooves in their outer surfaces. The grooves are typically formed in the outer wall of a smooth cable or duct. Such conventional cables or ducts having annular grooves may have flexibility to bend in a direction transverse to the longitudinal dimension of the cable or duct. Additionally, such conventional cable or ducts may be restrained from moving in the axial direction of the longitudinal dimension relative to, for example, a connector that is attached to an end of the cable or duct and includes an engagement structure that is configured to engage one or more of the annular grooves. However, such conventional cables and ducts are not prevented from rotating relative to the connector.

It may be desirable to provide a cable or duct that is configured to be engaged by an engagement structure of a connector such the cable or duct is prevented from rotating relative to the connector.

SUMMARY

According to various aspects of the disclosure, a fiber optic cable assembly includes a fiber optic cable and a fiber optic connector. The fiber optic cable has an outer surface that includes a plurality of annular grooves spaced apart from one another in an axial direction of the fiber optic cable, and a plurality of axial grooves that extend in the axial direction. The plurality of axial grooves being spaced apart from one another in a circumferential direction of the fiber optic cable, the plurality of axial grooves are configured to divide the outer surface in a circumferential direction of the fiber optic cable into separate section, the separate sections are configured to hinge against each other such that the fiber optic cable is bendable to a predetermined bend radius, the fiber optic connector includes an axial ridge configured to be received by one of the plurality of axial grooves, and cooperative engagement between the axial ridge of the fiber optic connector and the one of the plurality of axial grooves of the fiber optic cable prevents rotation of the fiber optic cable relative to the fiber optic connector.

In accordance with various aspects of the disclosure, a linear member includes an outer surface that includes an annular groove and an axial groove. The axial groove extends in an axial direction of the linear member. The axial groove is configured to be gripped by a connector to prevent rotation of the linear member relative to the connector.

In some embodiments, an additional axial groove in the outer surface extends in the axial direction and separates sections of the outer surface in a circumferential direction of the linear member.

In some embodiments, an additional annular groove separate sections of the outer surface. The separate sections are configured to hinge against each other such that the linear member is bendable to a predetermined bend radius.

In some embodiments, the linear member is terminated with a connector, and the connector includes an engagement feature configured to be received by the axial groove of the linear member. In some aspects, the engagement feature is an axial ridge configured to be received by the axial groove. In some aspects, the connector is a fiber optic connector and the linear member is a fiber optic cable. In some aspects, cooperative engagement between the engagement feature of the connector and the axial groove of the linear member prevents rotation of the linear member relative to the connector.

In some embodiments, the linear member is a duct, a cable, or a tube.

BRIEF DESCRIPTION OF THE DRAWINGS

Features and advantages of the present disclosure are described in, and will be apparent from, the following Brief Description of the Drawings and Detailed Description.

DETAILED DESCRIPTION OF EMBODIMENTS

Throughout the description, like reference numerals will refer to like parts in the various drawing figures. As a preface to the detailed description, it should be noted that, as used in this specification and the appended claims, the singular forms "a," "an," and "the" include plural referents, unless the context clearly dictates otherwise.

Figure 1:
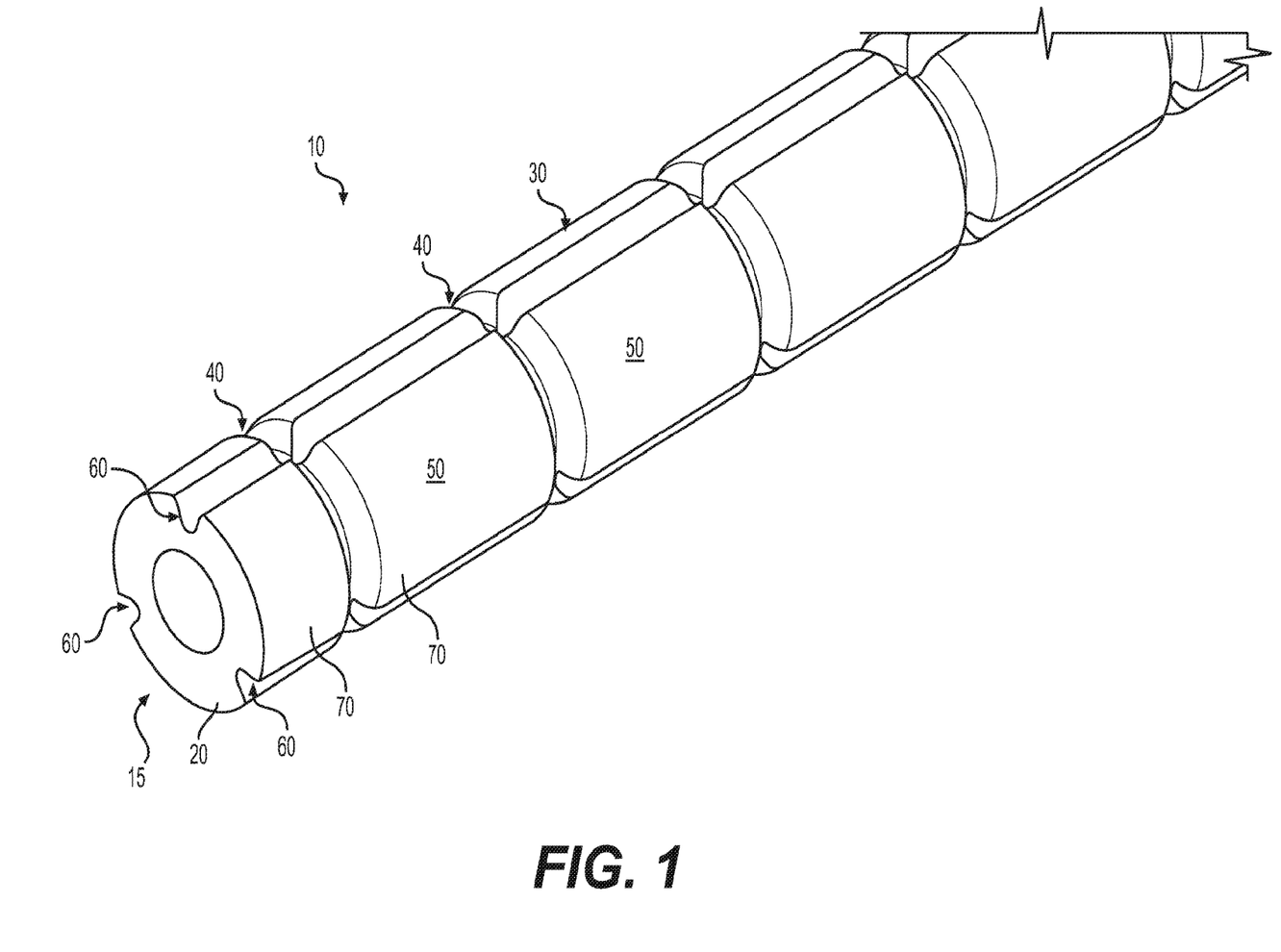
FIG. 1 is a perspective view of an exemplary embodiment of a linear member in accordance with various aspects of the disclosure.
Figure 2:
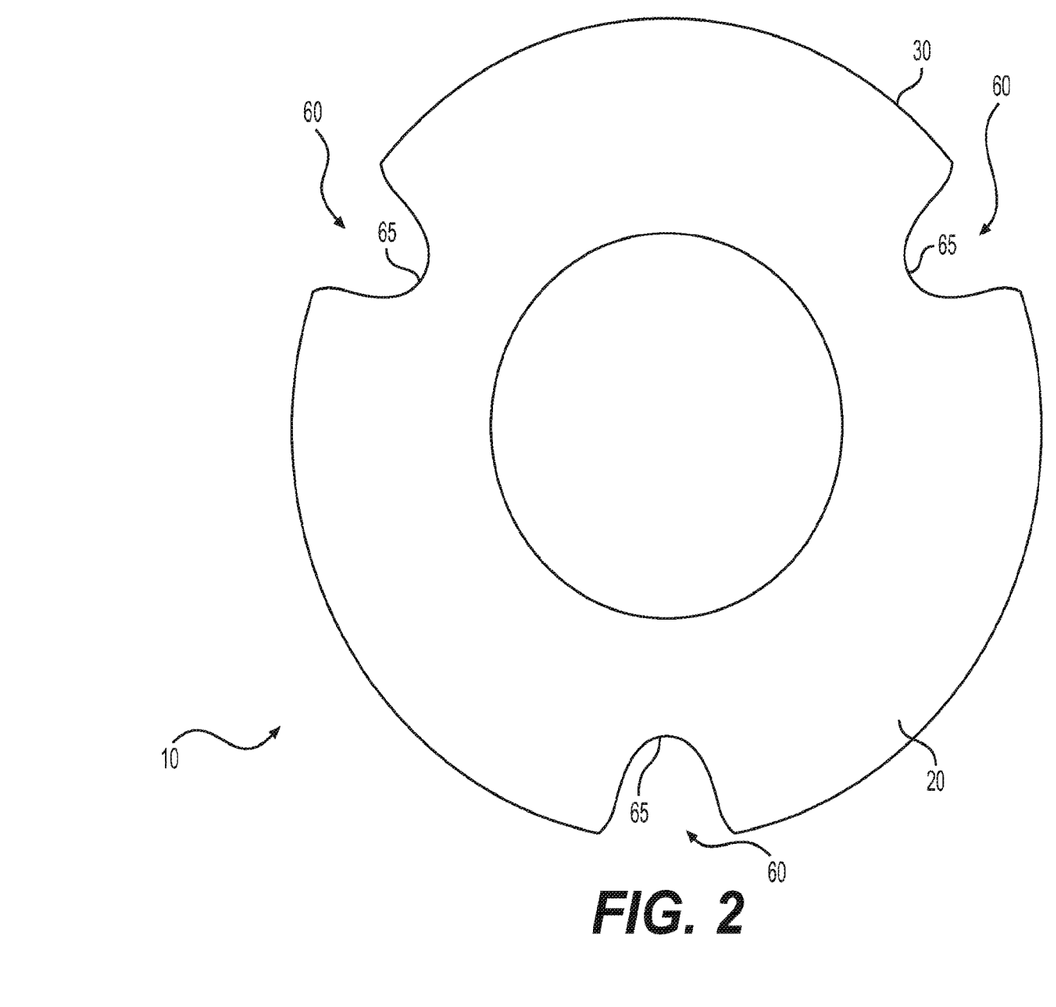
FIG. 2 is a cross-sectional view of the exemplary linear member of FIG. 1 along line II-II.

FIGS. 1 and 2 illustrate an exemplary linear member linear member 10, for example, a cable, duct, or tube, according to various aspects of the present disclosure. Linear member 10 is a tubular member 20 having an outer surface 30 that includes a plurality of annular grooves 40, which separate sections 50 of the outer surface 30. As is known, the provision of the series of annular grooves causes the separate sections 50 to hinge against each other, such that the linear member 10 can be easily bent to a predetermined bend radius, but a very substantial force must be applied to bend the linear member to a smaller bend radius.

The linear member 10 further includes a plurality of axial grooves 60 that extend in a direction of the longitudinal dimension of the linear member 10. The axial grooves 60 separate sections 70 of the outer surface 30 in the circumferential direction of the linear member 10. The axial grooves 60 provide a structure that can be gripped by an engagement feature of, for example, a connector that terminates an end 15 of the linear member 10. The axial grooves 60 may also increase the flexibility of the linear member 10, for example, the torsional flexibility of the linear member 10 about its longitudinal axis.

Figure 3:
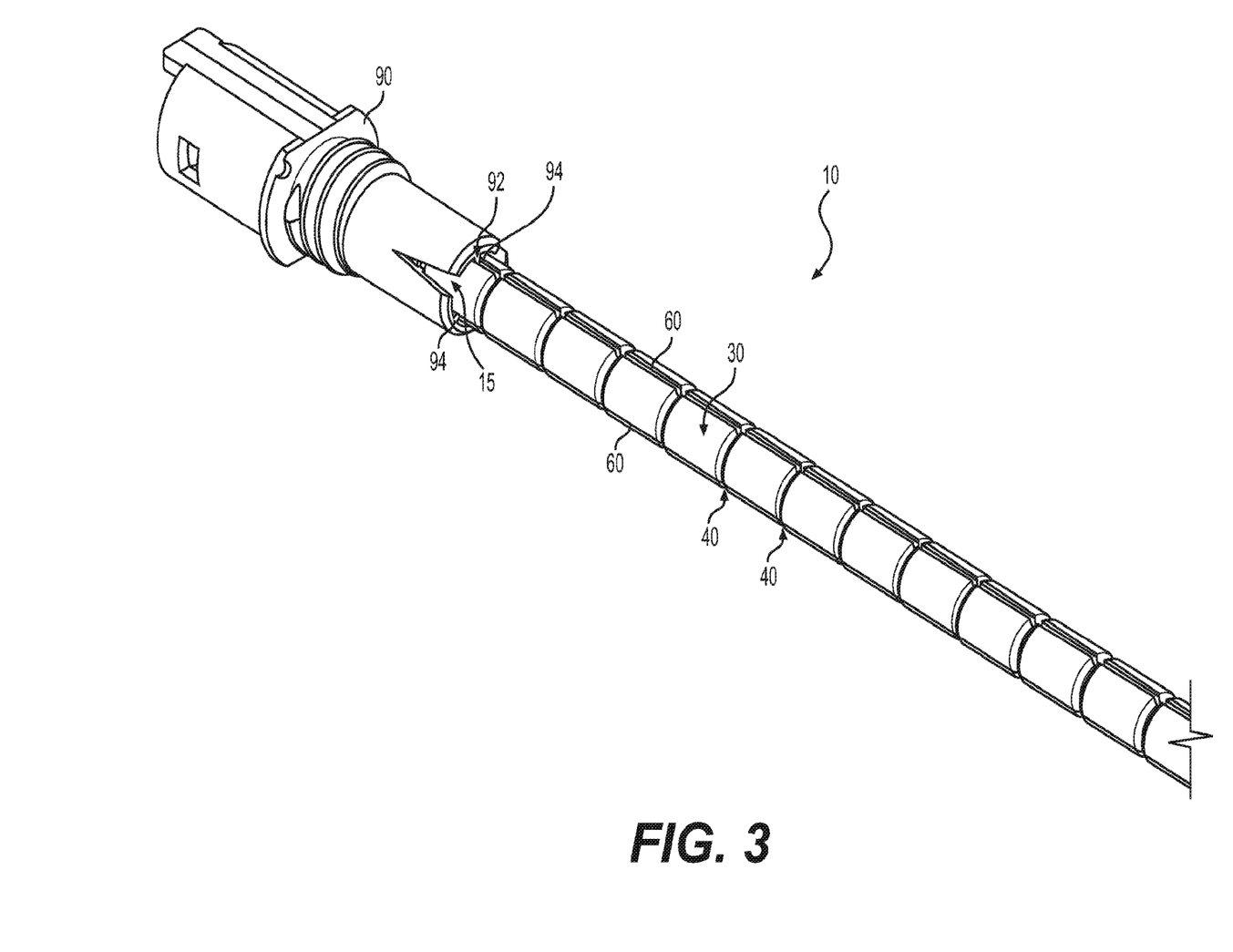
FIG. 3 is a perspective view of the exemplary linear member of FIG. 1 terminated with an exemplary connector.
Figure 4:
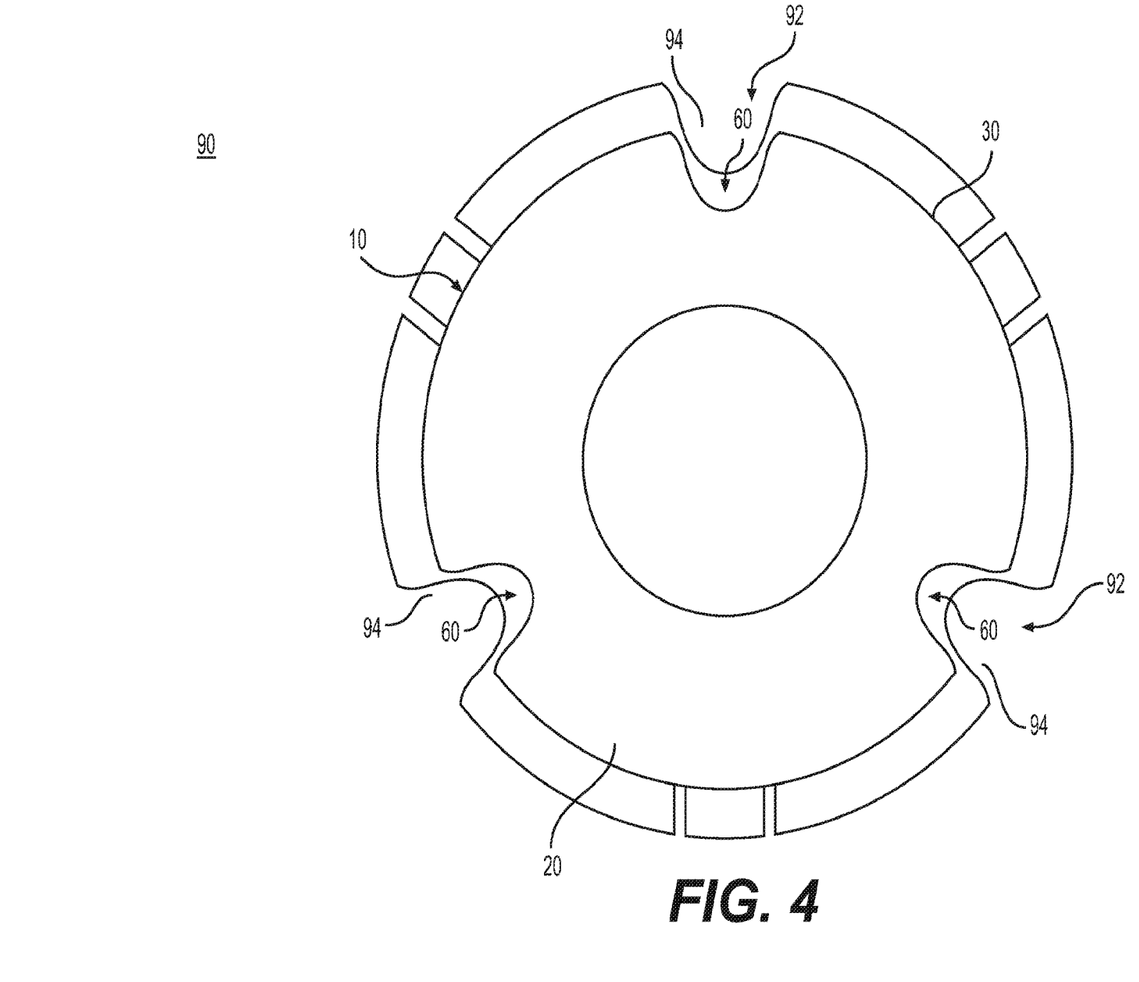
FIG. 4 is a cross-sectional view of the exemplary linear member of FIG. 1 along line IV-IV.

Referring to FIGS. 3 and 4, a connector 90 terminates the end 15 of the linear member 10. In the embodiment of FIGS. 3 and 4, the connector 90 is a fiber optic connector and the linear member 10 is a fiber optic cable. The connector 90 includes an engagement feature 92 in the form of axial ridges 94 that are configured to be received by the axial grooves 60 of the linear member 10. Cooperative engagement between the engagement feature 92 of the connector 90 and the axial groove 60 of the linear member 10 prevents rotation of the linear member 10 relative to the connector 90.

In the embodiment illustrated in FIGS. 3 and 4, the linear member 10 includes three axial grooves 60 extending along an entire length of the linear member 10, and the connector includes three axial ridges 94 that are configured to be received by the three axial grooves 60. It should be understood that, in some embodiments, the connector 90 may instead include one or two axial ridges 94 that are configured to be received in one or two of the three axial grooves 60, respectively. Cooperative engagement between at least one engagement feature 92 of the connector 90 and at least one axial groove 60 of the linear member 10 prevents rotation of the linear member 10 relative to the connector 90.

Figure 5:
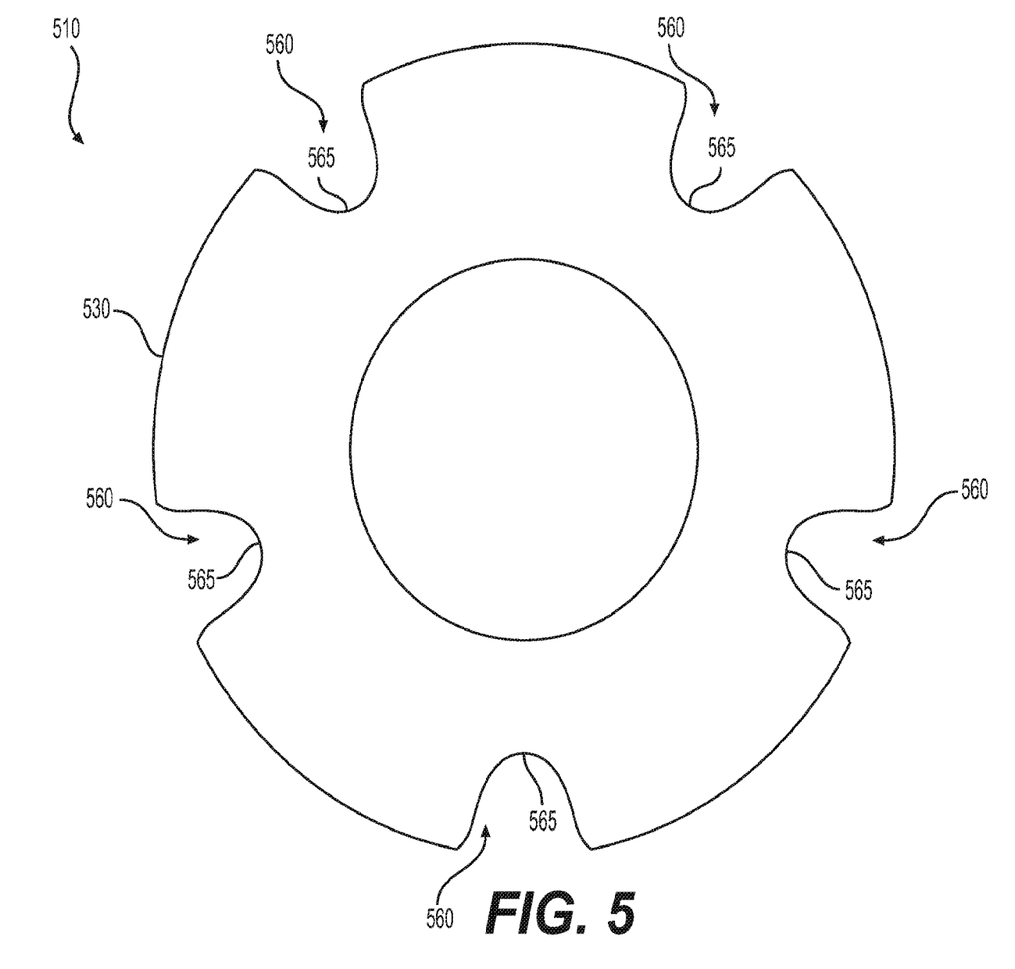
FIG. 5 is a cross-sectional view of another exemplary embodiment of a linear member in accordance with various aspects of the disclosure

It should also be understood that, in various embodiments, the linear member 10 may include less or more than three axial grooves and the connector may include a number of axial ridges equal to or less than the number of axial grooves, as long as each axial ridge is arranged to be received by an axial groove. For example, as shown in the embodiment of FIG. 5, a linear member 510 may include five axial grooves 560.

Figure 6:
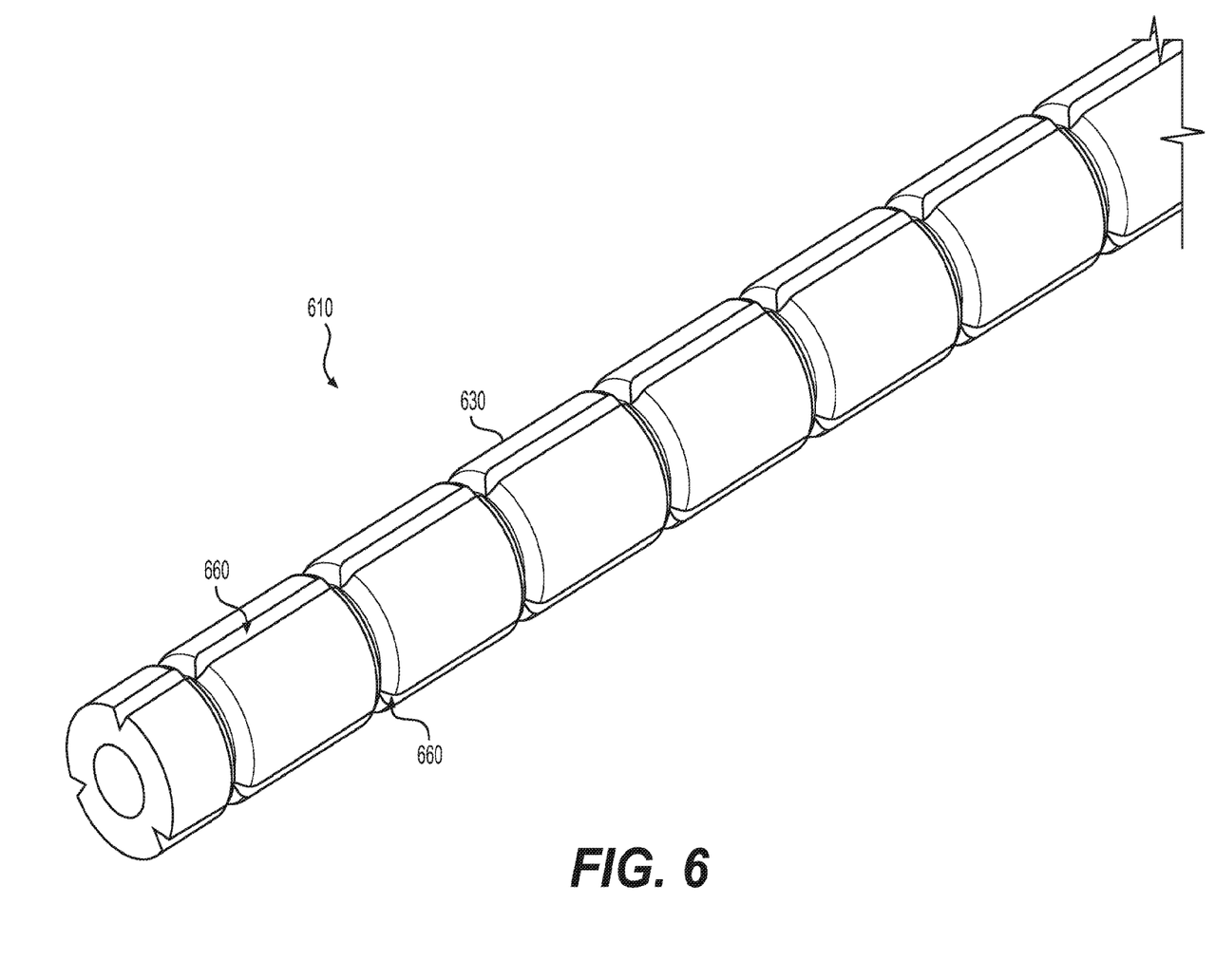
FIG. 6 is a perspective view of another exemplary embodiment of a linear member in accordance with various aspects of the disclosure.
Figure 7:
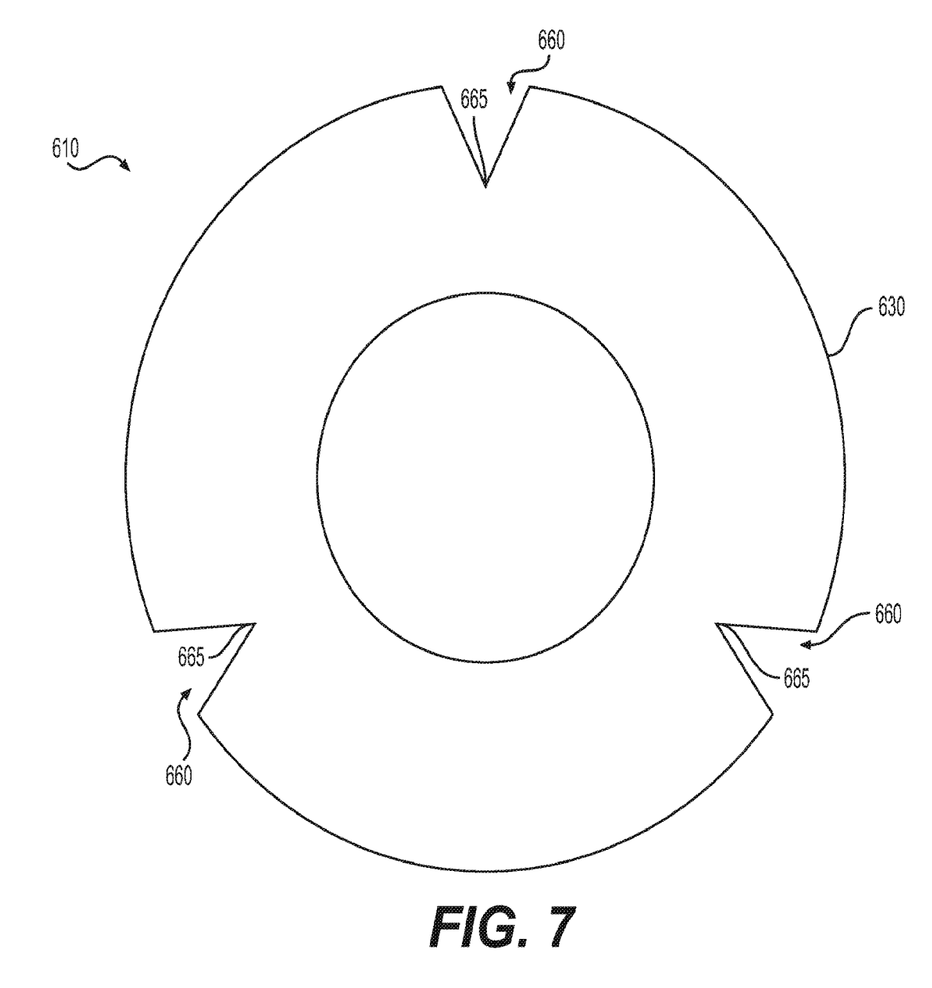
FIG. 7 is a cross-sectional view of the exemplary linear member of FIG. 6 along line VII-VII.
Figure 8:
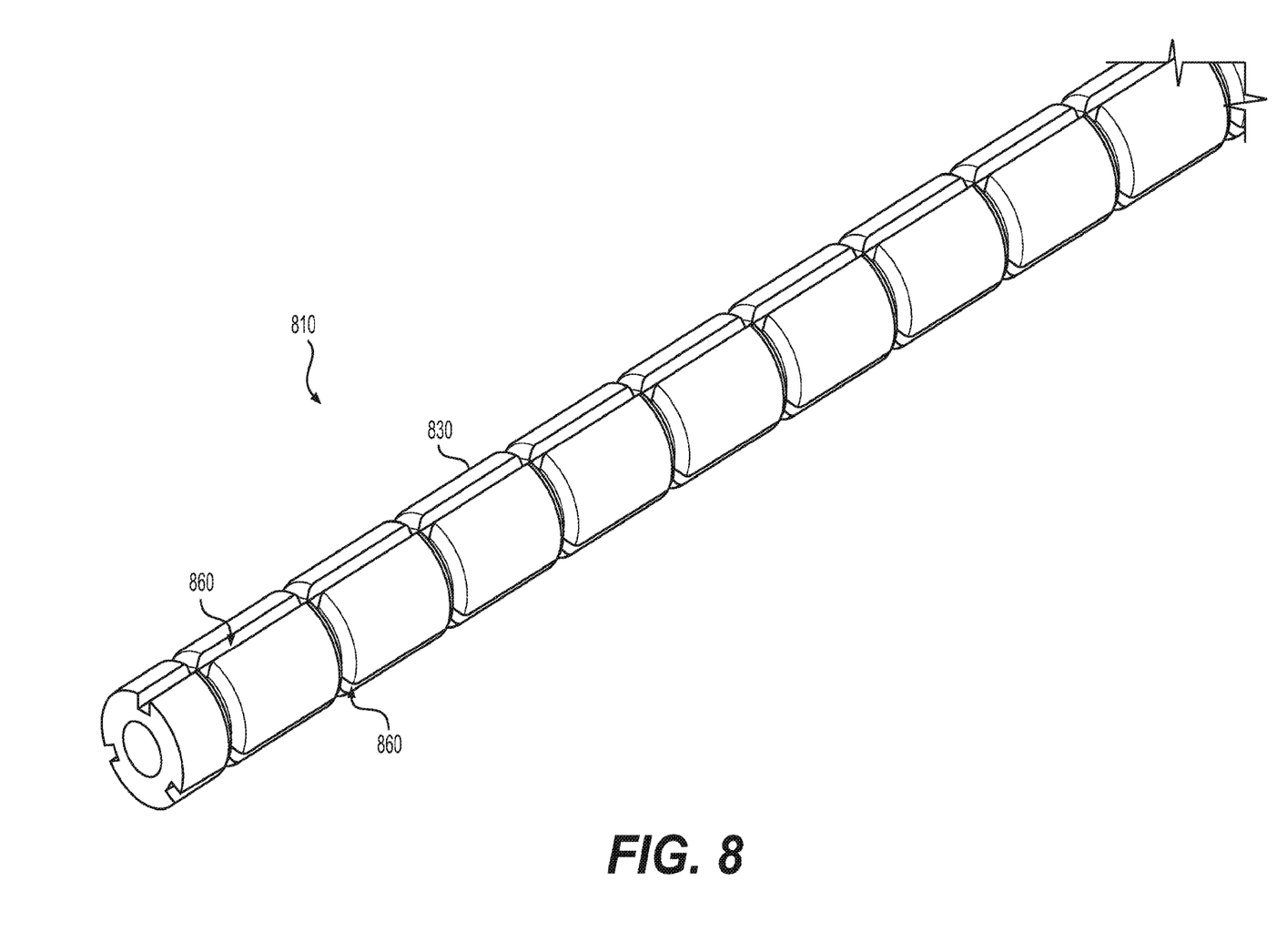
FIG. 8 is a perspective view of another exemplary embodiment of a linear member in accordance with various aspects of the disclosure.
Figure 9:
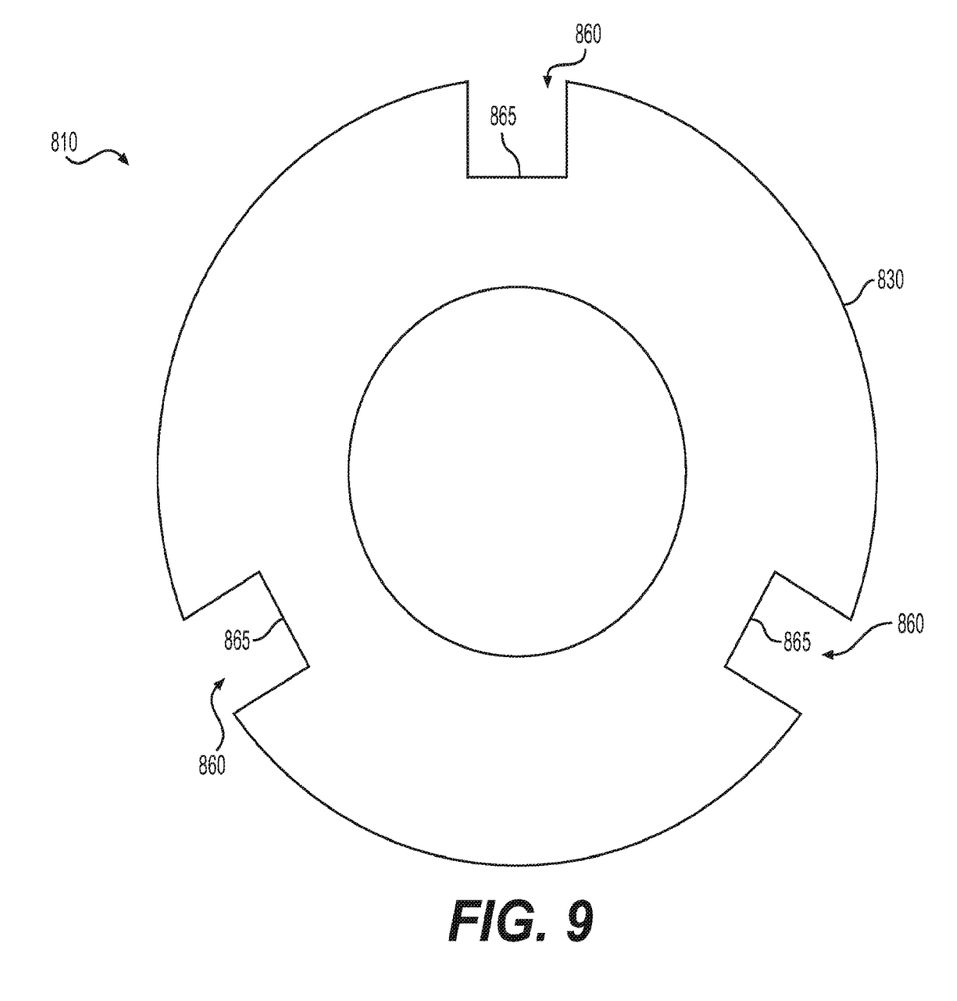
FIG. 9 is a cross-sectional view of the exemplary linear member of FIG. 8 along line IX-IX.

Referring to FIGS. 1-5, the axial grooves 60, 560 may include a U-shaped cross-sectional profile that tapers from the outer surface 30, 530 of the linear member 10, 510 to a curve at a radially innermost location 65, 565 of the axial groove 60, 560. In some embodiments, as shown in FIGS. 6 and 7, a linear member 610 may include axial grooves 660 having a V-shaped cross-sectional profile that tapers from the outer surface 630 of the linear member 610 to a point at a radially innermost location 665 of the axial groove 660. In other embodiments, as shown in FIGS. 8 and 9, a linear member 810 may include axial grooves 860 having a square or rectangular cross-sectional profile that extends from the outer surface 830 of the linear member 810 to a radially inner wall 865 of the axial groove 860.

Figure 10:
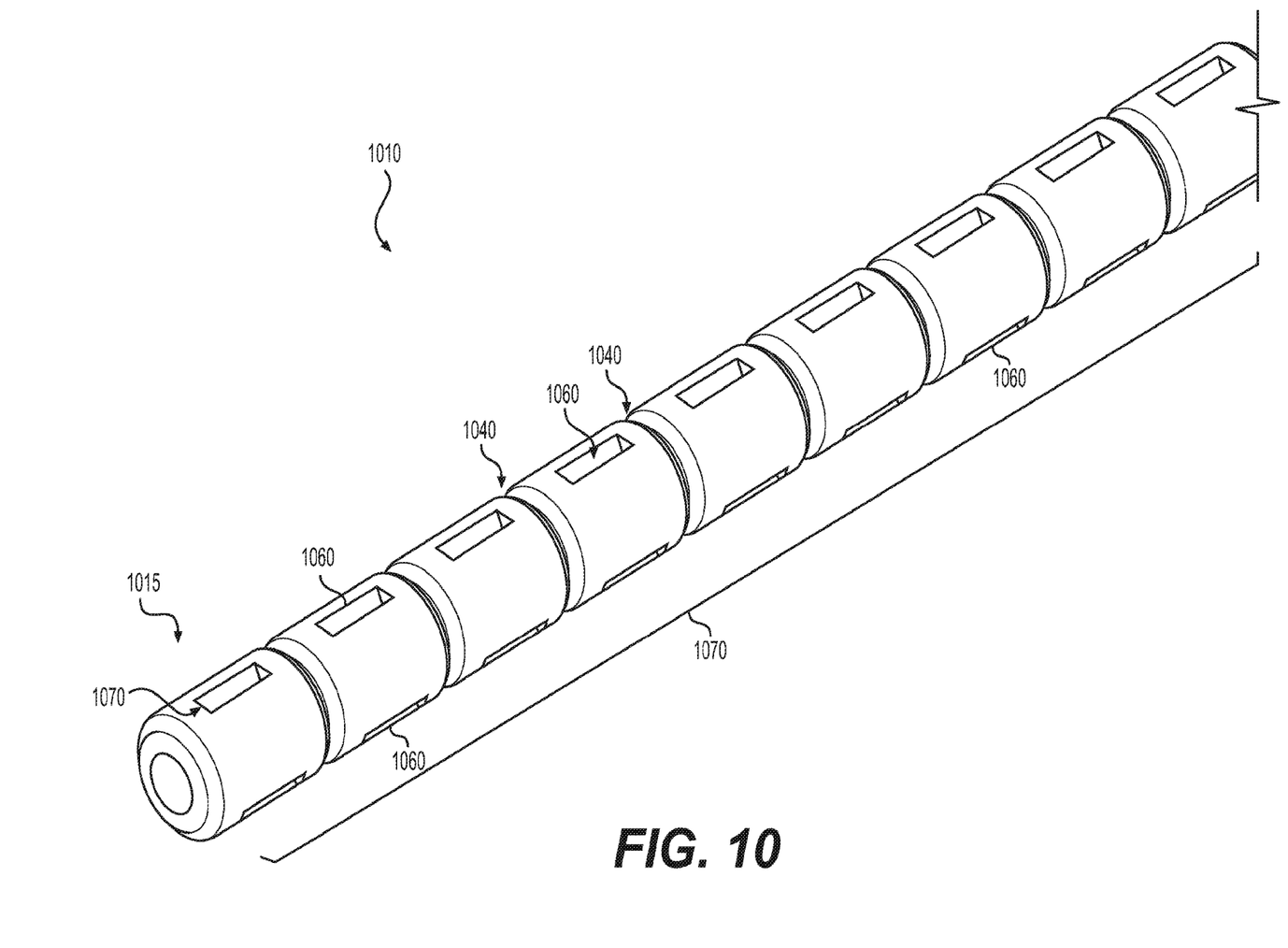
FIG. 10 is a perspective view of another exemplary embodiment of a linear member in accordance with various aspects of the disclosure.

Referring now to FIG. 10, an exemplary linear member 1010 according to the disclosure includes one or more series 1070 of sequentially-arranged axial grooves 1060. Each of the axial grooves 1060 extends over only a portion of a length of the linear member 1010. For example, each of the axial grooves 1060 of the series 1070 extends between a pair of annular grooves 1040 without intersecting with the annular grooves 1040. A connector (not shown) to be connected with an end 1015 of the linear member 1010 may include an engagement feature in the form of one or more axial ridges having a length that is equal to or less than the length of the respective axial groove(s) 1060 and being configured to be received by the axial groove(s) 1060 of the linear member 1010. In some aspects, the engagement feature may include a plurality of axially-aligned axial ridges and/or one or more circumferentially spaced axial ridges. Cooperative engagement between the engagement feature of the connector and the axial groove(s) 1060 of the linear member 1010 will prevent rotation of the linear member 1010 relative to the connector.

Figure 11:
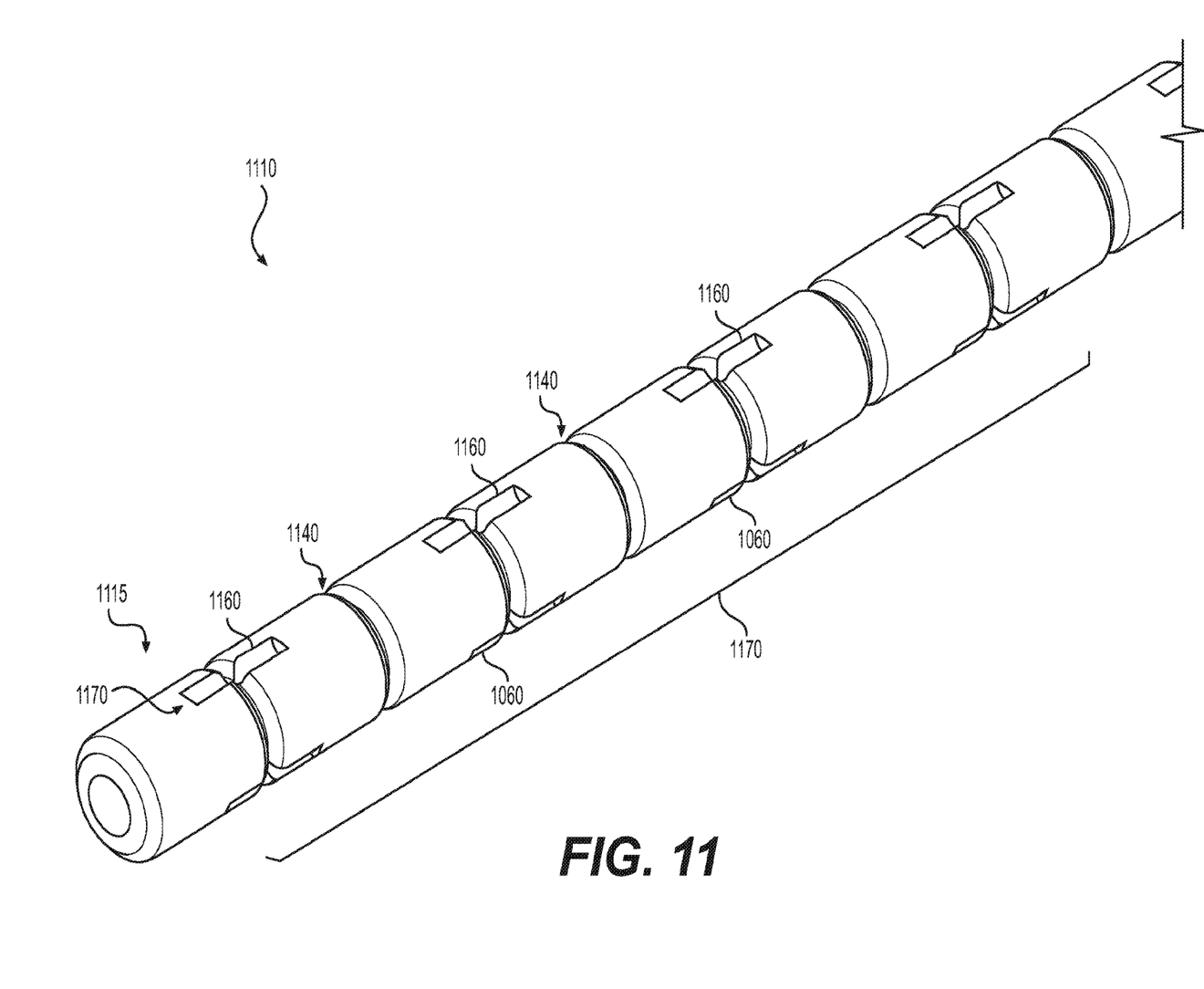
FIG. 11 is a perspective view of another exemplary embodiment of a linear member in accordance with various aspects of the disclosure.

Referring now to FIG. 11, an exemplary linear member 1110 according to the disclosure includes one or more series 1170 of sequentially-arranged axial grooves 1160. Each of the axial grooves 1160 intersects with an annular groove 1140. As shown in FIG. 10, each pair of adjacent axial grooves 1160 is spaced apart from one another such that an additional annular groove 1140 is between the pair of adjacent axial grooves 1160. In some embodiments, the axial grooves of a series may be spaced closer together such that each of the annular grooves 1140 may be intersected by an axial groove. A connector (not shown) to be connected with an end 1115 of the linear member 1110 may include an engagement feature in the form of one or more axial ridges having a length that is equal to or less than the length of the respective axial groove(s) 1160 and being configured to be received by the axial groove(s) 1160 of the linear member 1110. In some aspects, the engagement feature may include a plurality of axially-aligned axial ridges and/or one or more circumferentially spaced axial ridges. Cooperative engagement between the engagement feature of the connector and the axial groove(s) 1160 of the linear member 1110 will prevent rotation of the linear member 1110 relative to the connector.

Figure 12:
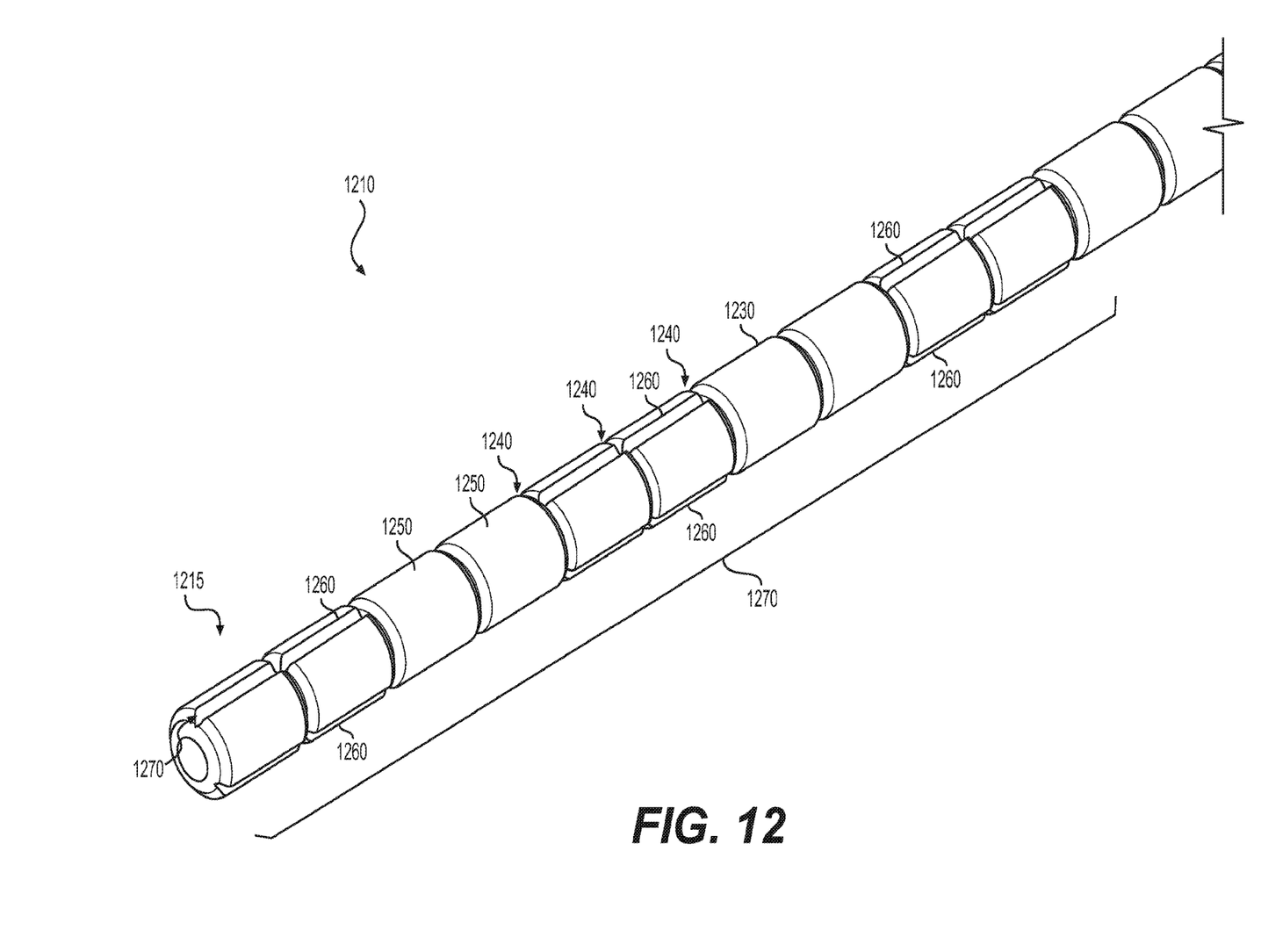
FIG. 12 is a perspective view of another exemplary embodiment of a linear member in accordance with various aspects of the disclosure.

Referring to FIG. 12, an exemplary linear member 1210 according to the disclosure includes one or more series 1270 of sequentially-arranged axial grooves 1260. Each of the axial grooves 1260 intersects with and extends for an axial length between three annular grooves 1240. As shown in FIG. 10, each pair of adjacent axial grooves 1260 is spaced apart from one another such that two sections 1250 of the outer surface 1230 of the linear member 1210 are between the pair of adjacent axial grooves 1260. In some embodiments, the axial grooves of a series may be spaced closer together such that only one section 1250 of the outer surface 1230 of the linear member 1210 is between the pair of adjacent axial grooves. A connector (not shown) to be connected with an end 1215 of the linear member 1210 may include an engagement feature in the form of one or more axial ridges having a length that is equal to or less than the length of the respective axial groove(s) 1260 and being configured to be received by the axial groove(s) 1260 of the linear member 1210. In some aspects, the engagement feature may include a plurality of axially-aligned axial ridges and/or one or more circumferentially spaced axial ridges. Cooperative engagement between the engagement feature of the connector and the axial groove(s) 1260 of the linear member 1210 will prevent rotation of the linear member 1210 relative to the connector.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A fiber optic cable, comprising:
   an outer surface that includes an annular groove;
   an axial groove that extends in an axial direction of the fiber optic cable;
   an additional annular groove that separates sections of the outer surface;
   wherein the axial groove is configured to be gripped by a connector to prevent rotation of the fiber optic cable relative to the connector;
   wherein the separate sections are configured to hinge against each other such that the fiber optic cable is bendable to a predetermined bend radius; and
   wherein the fiber optic cable comprises a duct, a cable, or a tube.

2. The fiber optic cable of claim 1, further comprising an additional axial groove in the outer surface that extends in the axial direction and separates sections of the outer surface in a circumferential direction of the fiber optic cable.

3. The fiber optic cable of claim 2, wherein the annular groove comprises a first annular groove and a second annular groove that is configured to separate first and second sections of the outer surface.

4. A fiber optic cable comprising:
   an outer surface portion that includes an annular groove portion and an axial receiving portion that is substantially perpendicular to the annular groove portion;
   an additional annular groove portion configured to separate sections of the outer surface portion;
   wherein the axial receiving portion is structurally configured to be gripped by a connector to prevent rotation of the fiber optic cable relative to the connector; and
   wherein the separate sections are structurally configured to hinge against each other such that the fiber optic cable is prevented from bending beyond a minimum bend radius.

5. The fiber optic cable of claim 4, further comprising a connector portion; and
   wherein the connector portion includes an engagement portion that is structurally configured to be received by the axial receiving portion.

6. The fiber optic cable of claim 5, wherein the engagement portion comprises an axial ridge, and the axial receiving portion comprises an axial groove structurally configured to receive the axial ridge.

7. The fiber optic cable of claim 5, wherein cooperative engagement between the engagement feature of the connector portion and the axial receiving portion prevents rotation of the outer surface portion relative to the connector portion.

8. The fiber optic cable of claim 5, wherein the connector portion comprises a fiber optic connector.

9. The fiber optic cable of claim 4, wherein the annular groove and the additional annular groove are configured to be spaced apart from one another in an axial direction of the fiber optic cable.

10. The fiber optic cable of claim 4, wherein the axial groove portion comprises a plurality of axial grooves that are configured to divide the outer surface portion in a circumferential direction of the fiber optic cable into separate sections.

11. A fiber optic cable comprising:
    an outer surface portion structurally configured to include a plurality of separate sections that are configured to prevent the fiber optic cable from bending beyond a minimum bend radius;
    an axial groove portion configured to extend in an axial direction of the fiber optic cable; and
    wherein the axial groove portion is configured to be gripped by a fiber optic connector to prevent rotation of the outer surface portion relative to the connector.

12. The fiber optic cable of claim 11, wherein the separate sections are configured to hinge against each other such that the fiber optic cable is prevented from bending beyond a minimum bend radius.

13. The fiber optic cable of claim 11, wherein the outer surface portion includes an annular groove portion that is substantially perpendicular to the axial groove portion; and
    wherein the annular groove portion is configured to provide the plurality of separate sections.

14. The fiber optic cable of claim 13, wherein the annular groove portion includes a plurality of annular grooves that are configured to be spaced apart from one another in an axial direction of the fiber optic cable.

15. The fiber optic cable of claim 11, further comprising a connector portion; and
    wherein the connector portion includes an engagement portion configured to be received by the axial groove portion.

16. The fiber optic cable of claim 15, wherein the connector portion comprises a fiber optic connector.

17. The fiber optic cable of claim 15, wherein the engagement portion comprises an axial ridge configured to be received by the axial groove portion.

18. The fiber optic cable of claim 15, wherein cooperative engagement between the engagement portion of the connector portion and the axial groove portion prevents rotation of the outer surface portion relative to the connector.

19. A fiber optic cable assembly comprising:
    a fiber optic cable portion configured to include an axial groove portion and an annular groove portion;
    a fiber optic connector portion configured to include an axial ridge portion for forming a non-rotatable portion between the fiber optic cable portion and the fiber optic connector portion;
    wherein the annular groove portion is structurally configured to prevent the fiber optic cable portion from bending beyond a minimum bend radius; and wherein the non-rotatable portion between the fiber optic cable portion and the fiber optic connector portion is structurally configured to prevent rotation of the fiber optic cable portion relative to the fiber optic connector portion during operation of the fiber optic cable assembly.

20. The fiber optic cable assembly of claim 19, wherein the axial groove portion of the fiber optic cable portion comprises a plurality of axial grooves, the axial ridge portion of the fiber optic connector comprises a plurality of axial ridges, and the non-rotatable portion comprises a plurality of non-rotatable portions.

21. The fiber optic cable assembly of claim 20, wherein the plurality of annular grooves are configured to be spaced apart from one another in axial direction of the fiber optic cable portion.

22. The fiber optic cable assembly of claim 20, wherein the plurality of axial grooves are configured to divide the outer surface in a circumferential direction of the fiber optic cable into separate sections; and
  wherein the separate sections are configured to hinge against each other such that the fiber optic cable portion is prevented from bending beyond a minimum bend radius.

23. An optical fiber device for coupling with a connector comprising:
  an annular groove portion configured to form a limited hinge portion that prevents the optical fiber device from bending beyond a minimum bend radius of the optical fiber device;
  an axial groove portion configured to form a non-rotatable portion between the optical fiber device and an axial engagement portion of a connector; and
  wherein the non-rotatable portion is configured to prevent rotation of the axial groove portion of the optical fiber device relative to the axial engagement portion of the connector.

24. The optical fiber device of claim 23, wherein the axial engagement portion of the connector comprises an axial ridge portion.

25. The optical fiber device of claim 23, wherein the axial groove portion comprises a first axial groove, and further comprising a second axial groove configured to separate first and second sections of an outer surface portion of the optical fiber device relative to a circumferential direction of the optical fiber device.

26. The optical fiber device of claim 23, wherein the annular groove portion comprises a first annular groove, and further comprising a second annular groove configured to separate first and second sections of an outer surface portion of the optical fiber device.

27. The optical fiber device of claim 26, wherein the separate first and second sections of the outer surface portion are configured to hinge against each other such that the optical fiber device is prevented from bending beyond a minimum bend radius of the optical fiber device.

28. The optical fiber device of claim 23, wherein the optical fiber device comprises a duct, a cable, or a tube.

* * * * *